United States Patent
Kimiabeigi (10) Patent No.: US 9,048,702 B2
(45) Date of Patent: Jun. 2, 2015

(54) GENERATOR WITH COMPACT SINGLE TURN WAVE WINDING AND WIND TURBINE

(75) Inventor: Mohammad Kimiabeigi, Sheffield (GB)

(73) Assignee: SIEMENS AKTIENGESELLSCHAFT, München (DE)

( * ) Notice: Subject to any disclaimer, the term of this patent is extended or adjusted under 35 U.S.C. 154(b) by 303 days.

(21) Appl. No.: 13/110,072

(22) Filed: May 18, 2011

(65) Prior Publication Data

US 2011/0285227 A1 Nov. 24, 2011

(30) Foreign Application Priority Data

May 19, 2010 (EP) .................................. 10163306

(51) Int. Cl.
| | |
|---|---|
| H02K 11/00 | (2006.01) |
| H02K 3/28 | (2006.01) |
| H02K 3/12 | (2006.01) |
| H02K 1/16 | (2006.01) |
| H02K 7/18 | (2006.01) |

(52) U.S. Cl.
CPC .................. *H02K 3/12* (2013.01); *H02K 1/165* (2013.01); *H02K 3/28* (2013.01); *Y02E 10/725* (2013.01); *H02K 7/1838* (2013.01)

(58) Field of Classification Search
CPC ........... H02K 3/12; H02K 1/165; H02K 3/28; H02K 7/1838
USPC .................................................. 310/179–208
See application file for complete search history.

(56) References Cited

U.S. PATENT DOCUMENTS

| | | | | |
|---|---|---|---|---|
| 1,499,695 | A * | 7/1924 | Rudenberg | 310/213 |
| 2,501,222 | A * | 3/1950 | Hybler | 310/216.008 |
| 5,753,991 | A * | 5/1998 | Couture et al. | 310/156.46 |
| 5,804,902 | A * | 9/1998 | Hill | 310/179 |
| 5,962,940 | A * | 10/1999 | Imlach | 310/90.5 |
| 6,373,164 | B1 | 4/2002 | Nishimura | |
| 7,126,313 | B2 * | 10/2006 | Dooley | 322/44 |
| 8,466,597 | B2 * | 6/2013 | Yabe et al. | 310/216.069 |
| 2002/0050395 | A1 | 5/2002 | Kusumoto et al. | |
| 2003/0201687 | A1 | 10/2003 | Asai | |
| 2004/0183392 | A1 | 9/2004 | Dooley | |
| 2005/0082924 | A1* | 4/2005 | Fukasaku et al. | 310/71 |
| 2005/0189833 | A1* | 9/2005 | Liao | 310/179 |
| 2005/0242785 | A1 | 11/2005 | Dooley | |
| 2007/0284962 | A1* | 12/2007 | Fukasaku et al. | 310/180 |
| 2008/0150389 | A1 | 6/2008 | Grabner | |
| 2008/0258572 | A1 | 10/2008 | Koehler | |

FOREIGN PATENT DOCUMENTS

| | | |
|---|---|---|
| CN | 1157675 A | 8/1997 |
| CN | 2826800 Y | 10/2006 |

(Continued)

OTHER PUBLICATIONS

Communication From European Patent Office, Feb. 27, 2012, pp. 1-6.

*Primary Examiner* — Dang Le
*Assistant Examiner* — Leda Pham (57) ABSTRACT

A generator is provided that includes at least one pole set representing one phase. Each pole set includes a plurality of poles. Only one conductor is turned about the poles of a particular pole set such that only half a single turn is associated to each pole of the particular pole set.

10 Claims, 5 Drawing Sheets

(56) References Cited

FOREIGN PATENT DOCUMENTS

| CN | 101232214 | A | 7/2008 |
|---|---|---|---|
| DE | 4411749 | A1 | 10/1995 |
| EP | 0878893 | A1 | 11/1998 |
| GB | 2331858 | A | 6/1999 |
| WO | WO 9834325 | A1 | 8/1998 |
| WO | WO 2005122367 | A1 | 12/2005 |
| WO | WO 2009084251 | A1 | 7/2009 |

* cited by examiner

GENERATOR WITH COMPACT SINGLE TURN WAVE WINDING AND WIND TURBINE

CROSS REFERENCE TO RELATED APPLICATIONS

This application claims priority of European Patent Office application No. 10163306.3 EP filed May 19, 2010, which is incorporated by reference herein in its entirety.

FIELD OF INVENTION

The present invention relates to a generator and to a wind turbine.

BACKGROUND OF INVENTION

Based on today's technology in direct drive generators, each coil is composed of more than one series turn while a chosen number of coils may also be connected in series. The two aforementioned selectable numbers, i.e. the number of series in turn and the number of coils connected in series, may be chosen to obtain the terminal voltage of the generator which itself may have already been chosen based on power electronics/grid requirements. In the described conventional type of winding, the series turns in each slot need to be electrically insulated from each other due to the voltage difference between the turns in series. Furthermore, the whole conductors in the slot need to be insulated from the neighbouring lamination via so called slot insulation due to the voltage difference between the turns and the lamination which is grounded through the coupling with shaft and wind tower.

The aforementioned type of insulation used in the slot of the machines with conventional windings, results in different disadvantages: Poor heat transfer coefficient of the insulation makes it very difficult for the main source of heat in the generator, i.e. the windings to get cooled down through the neighbouring laminations. Using the required insulation in the slots decreases the slot space for the active material, which is usually copper, and thereby the so called fill factor. This in turn reduces the out put torque for the same current density or decreases the efficiency for the same torque. A typical value of fill factor for conventional type of winding is in the range of 70-80%.

SUMMARY OF INVENTION

It is a first objective of the present invention to provide a generator with an increased slot fill factor and with decreased manufacturing costs. It is a second objective of the present invention to provide an advantageous wind turbine.

The above objectives are solved by the features of the independent claims. The depending claims define further developments of the present invention.

The inventive generator comprises at least one pole set representing one phase. Each pole set comprises a number of poles. Only one conductor is turned about the poles of a particular pole set such that only half a single turn is associated to each pole. The only one conductor, which may preferably a single turn solid or compact winding, can replace the conventional windings giving the advantage of having less insulation in the slot. This reduces the insulation between the conductor and a neighbouring lamination of the pole, so called slot insulation. Moreover, the conventional turn-turn insulation between the conductors within a slot becomes unnecessary. Furthermore, a better cooling of the windings and a higher slot fill factor can be achieved. Another advantage is that the manufacturing of the coils and the winding process becomes significantly easier and less costly than for multi-turn conventional windings. Furthermore, using only one solid or compact large conductor with the proposed suitable slot shape results in low skin effect loss.

The inventive generator may be a three phase or a multi-phase generator. In the inventive generator each phase may have a single Go or Return path, also designated as half a single turn, in each pole. The single Go or Return paths or half a single turns are arranged in a wave-like configuration. For example, the half a single turn itself can be a solid or compact conductor. It may return in the next pole and may continue this way of wave-like distribution along the whole circumference of the stator or rotor.

The inventive generator may comprise a stator comprising the at least one pole set. Additionally or alternatively, the generator may comprise a rotor comprising the at least one pole set. Preferably, the generator may comprise a stator, a rotor and a rotation axis. The stator may be located radially inside of the rotor (inner stator machine).

Advantageously the conductor comprises a number of, preferably solid or compact, conductor elements. The conductor elements can be conductively connected to each other. The conductor elements can be connected to each other by welding or by a mechanical fixation, for example.

Generally, the generator can comprise at least one slot between the poles. Preferably, the conductor elements may have the shape of straight bars or arcs. For example, a first straight bar can be placed in a slot and can be connected to a second straight bar in another slot by means of an arc. In this way the conductor elements can be connected to each other forming a wave-like configuration.

Generally, the conductor may at least partly be located in at least one slot between the poles. The generator may comprise a rotation axis. The slot may be closed or partly closed at a radial position related to the rotation axis. Advantageously, the slot may have a rectangular or trapezoidal or triangular shape in a plane perpendicular to the rotation axis. Preferably, the slot may have an incremental opening in radial direction related to the rotation axis.

Moreover, the slot can comprise at least one bridge which partially or fully closes the slot at a radial position. The bridge can be integral part of an element forming the slot, for example of a lamination of the pole. Alternatively, the bridge can be a separate element. In this case, the bridge can mechanically be fixed to the element forming the slot, for example to the pole lamination. For instance, the slot may comprise the side face. The element or lamination forming the slot can comprise a cavity in the side face of the slot. The cavity can be used for mechanical fixing the bridge. The mentioned bridges can be simply built by re-designing the tooth shape of the poles, especially of the lamination.

The bridge may comprise soft magnetic composite material or ferromagnetic material. For example, the bridge may be made of soft magnetic composite material or may be made of ferromagnetic material, via punching the lamination with the appropriate shape.

The use of separate conductor elements, as previously described, allows it to use a modular winding structure. This modular winding structure can be used for closed and semi-closed slots. This reduces the skin effect. Furthermore, it significantly simplifies the winding manufacturing, especially compared with conventional winding. For example, the conductor elements, preferably the straight bars, can be inserted into the slot, which may be a closed or semi-closed slot.

The use of trapezoidal or triangular slots with incremental opening, especially towards an air gap in inner stator machines, reduces the skin effect loss which emerges in the rectangular conductors with large radial height or deep slots.

The shape of the conductor can be optimized regarding the reduction of skin effect losses. In the same way, the shape of the slot and the shape of neighboring lamination teeth of the pole can be optimized. Moreover, having only one solid large conductor pole instead of having parallel conductors the insulation between series turns in conventional windings does not exist and completely disappear. In this aspect, the present invention is more efficient than having parallel conductors where still some thin varnish may be needed around the parallel conductors. Furthermore, the slot insulation can be optimized in thickness.

A further possibility to reduce the skin effect in the single turn solid conductor is to reduce the radial height or depth of the conductor. For example, the at least one slot may have an average width w and a radial depth h related to the rotation axis of the generator. The average width w can be of a value of at least 90% of the value of the depth h. Preferably the average width w can be comparable or larger than the depth h. Keeping the area of the conductor fixed, the slot width then need to become larger. As a result, the number of slots versus the poles will be reduced. Therefore, a concentrated winding, for example in form of only one single turn solid or compact conductor, as previously described, can be used. Such a concentrated winding has a low slot to pole number ratio.

In combination with the previously mentioned optimised conductor shape, especially if an inner stator is used, the slots can be practically be made in a trapezoidal shape. In this case, the teeth or poles can be kept rectangular. The combination of these two parameters using shallow and trapezoidal slots reduces the skin effect effectively. Moreover, to improve the magnetic circuit and/or to reduce the skin effect even further closed or semi-closed slots or bridges in the middle of the slots may be used.

FE 2D analysis has shown that each of these suggested shapes will reduce the skin effect loss significantly. Furthermore, a combination of these suggested cases reduces the skin effect even further.

One draw back of using the previously described bridge is that the slot leakage will be increased. This is to some extent an advantage since it reduces the short circuit current and this way adds to reliability of the generator, for example the direct drive generator. However, possibly more significantly the output torque of the generator will fall due to flux leakage. Therefore, the decision on thickness of the bridges is a trade off between having lower skin effect on the one hand and not losing too much torque on the other hand.

Generally, the generator may comprise at least 3 pole sets. The generator may be a direct drive generator.

In the present invention, the conventional insulation between the conductors placed together in a slot and also the slot insulation are significantly reduced. This improves the slot fill factor and enhances the cooling of the generator, for example of a permanent magnet generator. Such a permanent magnet generator can, for example, be used in direct drive wind turbine applications. Furthermore, simple and modular windings are defined and provided by the present invention. This significantly simplifies the manufacturing and the winding process, thereby lowering the associated costs.

The requirement of having turn-turn insulation was removed by using single turn solid coil winding. Furthermore, the slot insulation (between the single conductor and the neighbouring teeth) is minimized by choosing its thickness optimally for each slot, realizing that each slot has a different/unique voltage difference with its neighbouring teeth. This optimal selection is not possible for conventional multi-turn windings as more than one voltage difference exists in each slot; thereby the selection is based on the worst case.

Taking the advantage of having less winding and slot insulation and all the following improvement of the generator performance, a drawback of having high extra AC loss due to skin effect are effectively reduced by the described conductor/slot shapes.

The inventive wind turbine comprises an inventive generator, as previously described. The inventive wind turbine has the same advantages as the inventive generator.

BRIEF DESCRIPTION OF THE DRAWINGS

Further features, properties and advantages of the present invention will become clear from the following description of an embodiment in conjunction with the accompanying drawings. All mentioned features and properties are advantageous alone or in any combination with each other.

DETAILED DESCRIPTION OF INVENTION

An embodiment of the present invention will now be described with reference to FIGS. 1 to 14.

Figure 1:
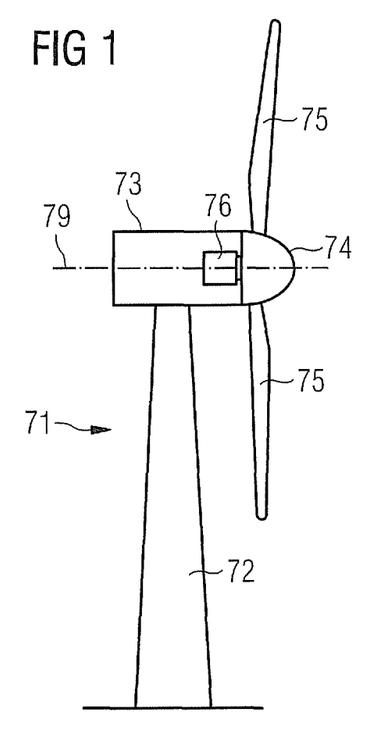
FIG. 1 schematically shows a wind turbine.

FIG. 1 schematically shows a wind turbine 71. The wind turbine 71 comprises a tower 72, a nacelle 73 and a hub 74. The nacelle 73 is located on top of the tower 72. The hub 74 comprises a number of wind turbine blades 75. The hub 74 is mounted to the nacelle 73. Moreover, the hub 74 is pivot-mounted such that it is able to rotate about a rotation axis 79. A generator 76 is located inside the nacelle 73. The wind turbine 71 is a direct drive wind turbine.

Figure 2:
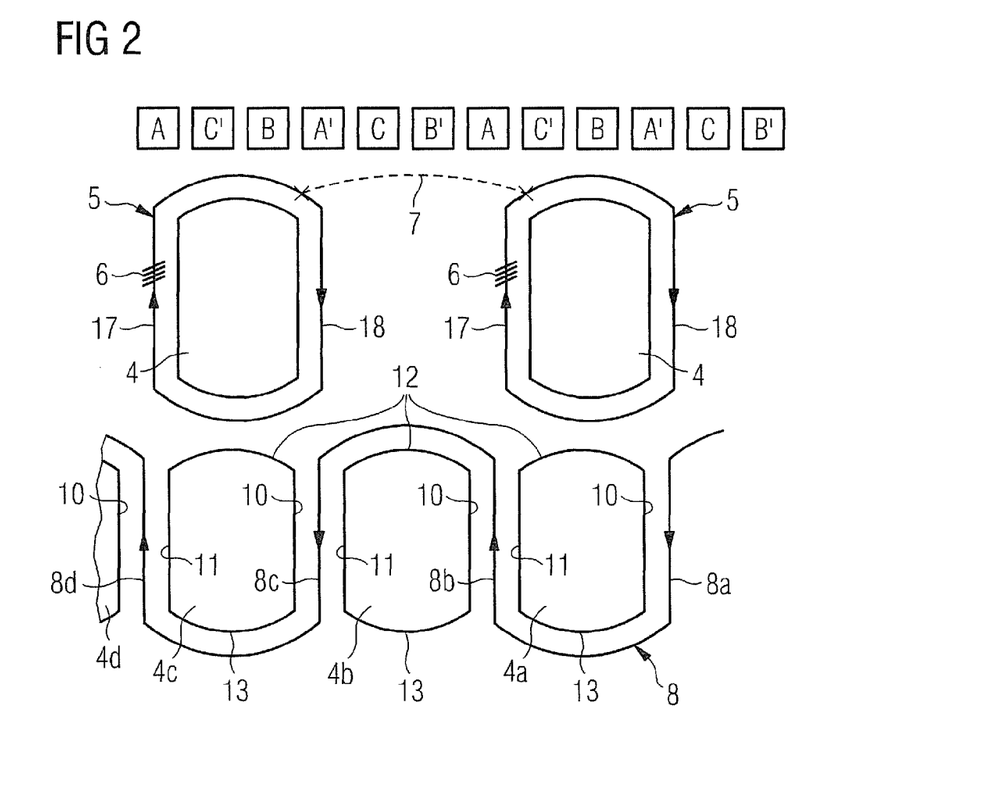
FIG. 2 schematically shows a comparative illustration of multi-turn and single turn wave windings for one phase and four poles.

FIG. 2 schematically shows a comparative illustration of multi-turn and single turn wave windings for one phase and four poles. The upper part of FIG. 2 shows the distributed winding with slots per pole and phase equal to 1 for a 3-phase machine, phases A, B and C. A, B and C correspond to Go direction of the phases and A', B' and C' correspond to Return direction, i.e. opposite direction, of the phases.

In the middle part of FIG. 2 two poles 4 representing the first phase are shown. Each of the poles 4 comprises a number of conductor windings 5 with multiple-turns per pole 4. The strokes 6 indicate the more than one series turns. The conductors 5 are connected in series. This is indicated by the dashed line 7. Due to the series turns each of the poles 4 or coils comprises a number of Go paths 17 and a number of Return paths 18.

The lower part of FIG. 2 schematically shows the inventive single turn wave windings for one phase of an inventive generator. The pole set belonging to the first phase A comprises a number of poles 4, from which four poles 4a, 4b, 4c and 4d are shown. Generally, the poles 4 may comprise a lamination.

Each pole 4 comprises a right side 10, a left side 11, a front side 12 and a back side 13. A conductor 8 is wave-like turned about the poles 4. The conductor 8 comprises a first half turn 8a, a second half turn 8b, a third half turn 8c and a fourth half turn 8d. The first half turn 8a represents a Return path A', the second half turn 8b represents a Go path A, the third half turn 8c represents a Return path A' and the fourth half turn 8d represents a Go path A.

The first half turn 8a proceeds along the right side 10 of the first pole 4a and proceeds further along the back side 13 of the first pole 4a. Then it proceeds further along the left side 11 of the first pole 4a and at the same time along the right side 11 of the second pole 4b. This means, that the conductor passes a slot between the first pole 4a and the second pole 4b. Then the conductor 8 further proceeds along the front side 11 of the second pole 4b, then along the left side 11 of the second pole 4b and at the same time along the right side 10 of the third pole 4c. The conductor 8 further proceeds along the back side 13 of the third pole 4c and along the left side of the third pole 4c and at the same time along the right side 10 of the fourth pole 4d.

Figure 3:
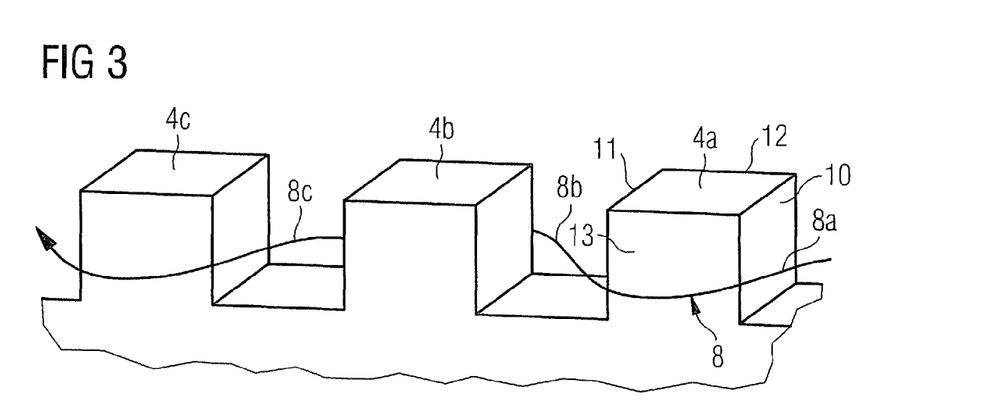
FIG. 3 schematically shows part of a single turn wave windings of the lower part of FIG. 2 in a perspective view.

In this wave-like configuration the first half a turn 8a is associated to the first pole 4a, the second half a turn 8b is associated to the second pole 4b, the third half a turn 8c is associated to the third pole 4c and the fourth half a turn 8d is associated to the fourth pole 4d. FIG. 3 schematically shows part of the single turn wave windings of the lower part of FIG. 2 in a perspective view. The poles 4 are separated from each other by slots 19.

A number of conductors 8 are connected in parallel and are turned about the poles in such a way that only half a single turn of each conductor is associated to each pole, as shown in the lower part in FIG. 2 and in FIG. 3. The optimal number of parallel conductors to give a low value of proximity and skin effect loss can be chosen analytically or experimentally or by simulation. An example is shown in FIG. 4.

Generally, the generator 76 can comprise an inner stator, which means that the stator is located radially inside of the rotor of the generator related to the rotation axis 79 of the rotor. Alternatively, the generator can comprise an outer stator, which means that the stator is located radially outside of the rotor of the generator related to the rotation axis 79 of the rotor. In both cases the rotor and/or the stator can comprise the described single turn wave winding.

Figure 4:
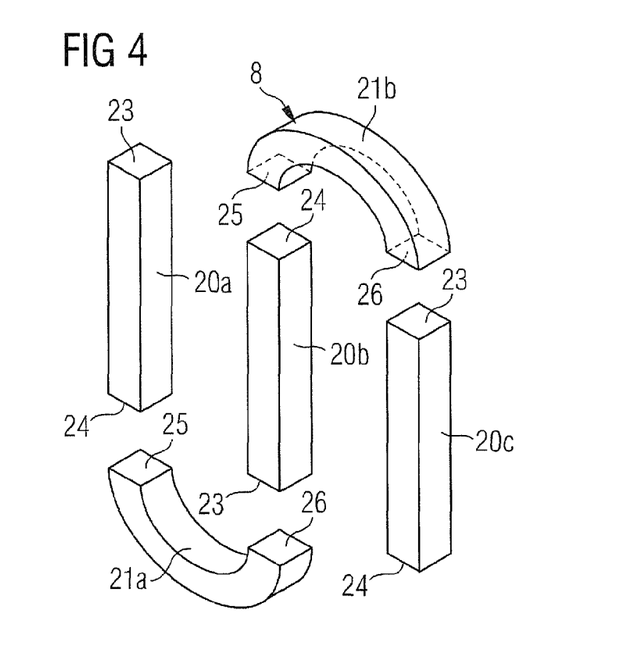
FIG. 4 schematically shows a single turn wave winding arrangement of conductor elements in a perspective view.

FIG. 4 schematically shows a single turn wave winding arrangement of conductor elements in a perspective view. The conductor 8 comprises a number of conductor elements 20, 21. The solid or compact conductor elements 20, 21 are connected to each other such that they form a single turn wave winding as shown in the lower part of FIG. 2 and in FIG. 3.

In FIG. 4 the conductor 8 comprises a number of conductor elements 20, which have the form of straight bars, and a number of conductor elements 21, which have the form of an arc. The conductor elements 20 in form of a straight bar have a first end 23 and a second end 24. The conductor elements 21 in form of an arc have a first end 25 and a second end 26. A first conductor element in form of a straight bar 20a is connected to a first conductor element in form of an arc 21a such that the second end 24 of the first conductor element 20a in form of a straight bar is connected to the first end 25 of the first conductor element 21a in form of an arc. The second end 26 of the first conductor element in form of an arc 21a is connected to the first end 23 of a second conductor element 20b in form of a straight bar. The second end 24 of the second conductor element 20b in form of a straight bar is connected to the first end 25 of a second conductor element 21b in form of an arc. The second end 26 of the second conductor element 21b in form of an arc is connected to the first end 23 of a third conductor element 20c in form of straight bar. By connecting a number of conductor elements 20, 21 in the described way a single turn wave winding as shown in FIG. 3 is obtained.

Figure 5:
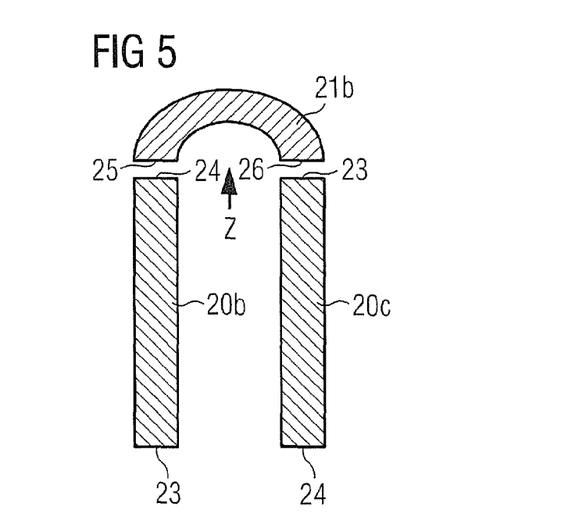
FIG. 5 schematically shows a single turn wave winding arrangement of conductor elements in a sectional view.
Figure 6:
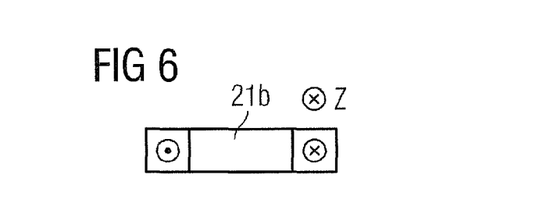
FIG. 6 schematically shows a conductor element in form of an arc in a perspective view.
Figure 7:
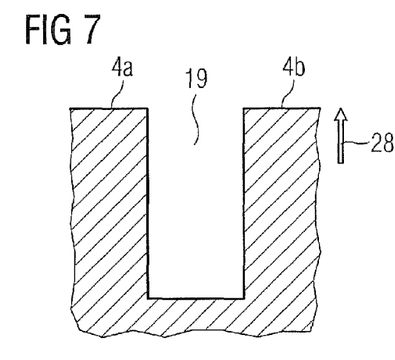
FIG. 7 schematically shows a rectangular slot in a sectional view.

FIG. 5 schematically shows part of the single turn wave winding arrangement of conductor elements, which is shown in FIG. 4, in a sectional view. The axial direction is designated as z-axis and is indicated by means of an arrow. FIG. 7 schematically shows the second conductor element 21b in form of an arc in a perspective view along z-direction. The current direction in the conductor element 21b is indicated by means of arrows.

FIGS. 7 to 12 schematically show different slot forms in sectional views. FIG. 7 schematically shows a rectangular slot 19 in a sectional view. The slot 19 is formed by a first pole 4a and a second pole 4b. The poles 4 comprise iron. They further may comprise a lamination. The radial direction is indicated by an arrow 28. The slot 19 comprises an opening in radial direction 28.

Figure 8:
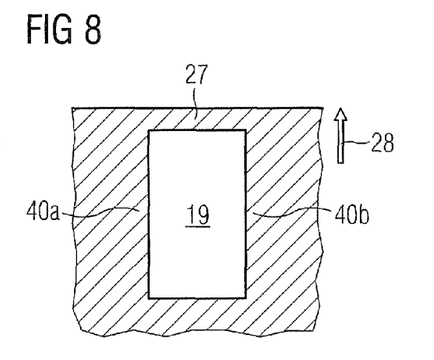
FIG. 8 schematically shows a rectangular closed slot in a sectional view.

FIG. 8 schematically shows a rectangular closed slot in a sectional view. Again, the slot 19 is formed by a first pole 40a and a second pole 40b. The poles 40 have the same properties as the previously described poles 4. At the position of the opening of the slot 19 in radial direction 28 the slot 19 in FIG. 8 is closed by means of a bridge 27. The bridge 27 connects the first pole 40a with a second pole 40b.

Generally, all bridges, which are shown in the FIGS. 8, 10 to 12 and 14, can be integral part of the adjacent poles or can be separate elements. In the last case they can mechanically be fixed to the poles. Moreover, all shown bridges can comprise or can be made of soft magnetic composite material or ferromagnetic material, for example iron.

Figure 9:
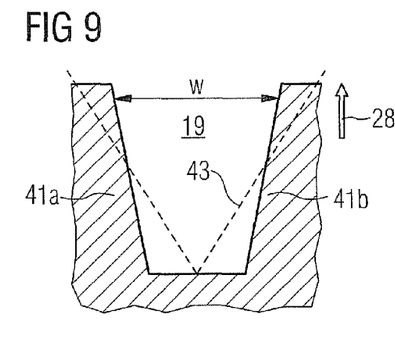
FIG. 9 schematically shows a trapezoidal and a triangular slot in a sectional view.

FIG. 9 schematically shows a trapezoidal slot 19 in a sectional view. The slot 19 is formed by a first pole 41a and a second pole 41b. The poles 41 can have the same properties as the previously described poles 4. In FIG. 9 the slot 19 has an increasing width w. The width w increases in radial direction 28. In a plane perpendicular to the rotation axis, which is identical with the shown sectional view, the slot 19 has a trapezoidal shape. The dashed line 43 in FIG. 9 indicates a further variant, wherein the slot 19 has a triangular shape with an increasing width w in radial direction 28.

Figure 10:
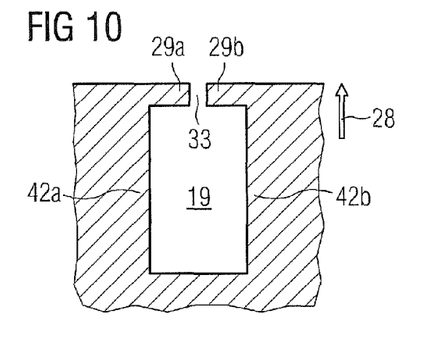
FIG. 10 schematically shows a rectangular semi-closed slot in a sectional view.

FIG. 10 schematically shows a semi-closed rectangular slot in a sectional view. The slot 19 is formed by a first pole 42a and a second pole 42b, which have the same properties as the previously described poles 4. The opening of the slot in radial direction 28 is partly closed by means of a bridge 29. The bridge 29 comprises a first portion 29a and a second portion 29b. The first portion 29a can be part of the first pole 42a or it can be a separate element which is connected to the first pole 42a. The second portion of the bridge 29b can be part of the second pole 42b or it can be a separate element which is connected to the second pole 42*b*. Between the first portion 29*a* and the second portion 29*b* of the bridge an opening 33 of the slot 19 in radial direction 28 is formed.

Figure 11:
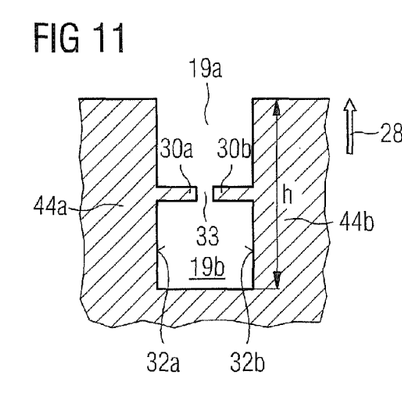
FIG. 11 schematically shows a variant of a rectangular semi-closed slot in a sectional view.

FIG. 11 schematically shows a variant of a rectangular semi-closed slot 19 in a sectional view. The slot 19 in FIG. 11 is formed by a first pole 44*a* and a second pole 44*b*, which have the same properties as the previously described poles 4. The slot 19 comprises inner side faces 32. The height h of the slot 19 is indicated by an arrow. The slot 19 is semi-closed by means of a bridge 30. The bridge 30 comprises a first portion 30*a* and a second portion 30*b*. The bridge 30 is located at about half of the height or depth h of the slot 19. The first portion 30*a* of the bridge is part of the first pole 44*a* or is connected to the first pole 44*a* at the side face 32 of the slot 19. The second portion 30*b* of the bridge is part of the second pole 44*b* or is connected to the second pole 44*b* at the side face 32*b* of the slot 19. The bridge 30 divides the slot 19 into an outer slot part 19*a* and an inner slot part 19*b*. The outer slot part 19*a* is located radially outside of the inner slot part 19*b*. The outer slot part 19*a* and the inner slot part 19*b* are connected to each other by means of an opening 33 between the first bridge portion 30*a* and the second bridge portion 30*b*.

Figure 12:
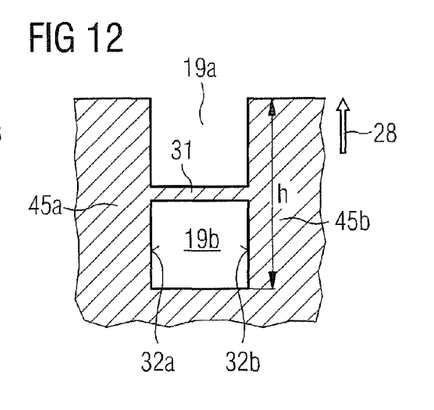
FIG. 12 schematically shows a rectangular closed slot in a sectional view.
Figure 13:
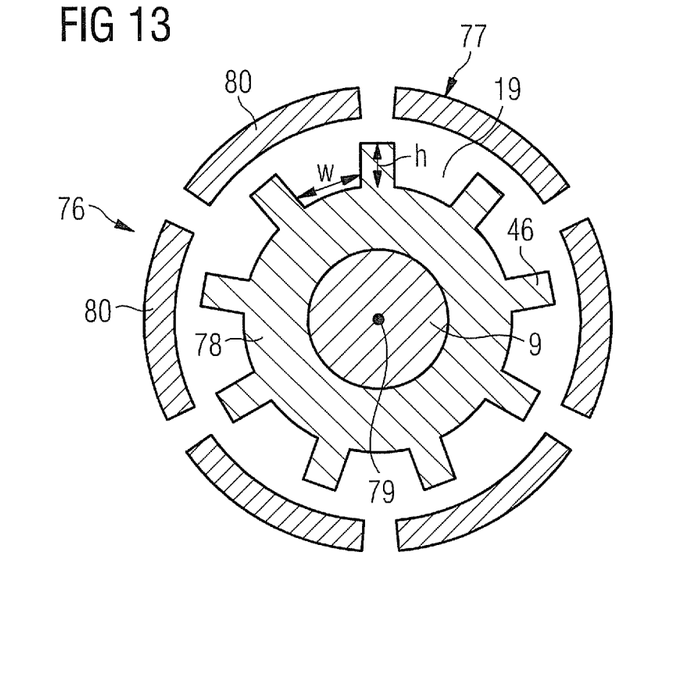
FIG. 13 schematically shows part of a generator in a sectional view.

FIG. 12 schematically shows a rectangular closed slot in a sectional view. The slot 19 of FIG. 13 is faulted by a first pole 45*a* and a second pole 45*b*, which has the same properties as the previously described poles 4. The poles 45*a* and 45*b* are connected to each other by means of a bridge 31. The bridge 31 is located at about half of the height h or depth h of the slot 19. The slot 19 comprises a first side face 32*a* and a second side face 32*b*. The bridge 31 connects the first side face 32*a* with the second side face 32*b* of the slot 19. The bridge 31 divides the slot 19 into a radially outer slot part 19*a* and a radially inner slot part 19*b*.

The slots 19 of FIGS. 7, 8, 10 to 12 have a rectangular shape in a plane perpendicular to the rotation axis, which is identical with the shown sectional views.

FIG. 13 schematically shows a generator 76 in a sectional view. The generator 76 comprises a rotation axis 79, a stator 78 and a rotor 77. In FIG. 13 the rotor 77 is located radially outside of the stator 78. This means, that the generator 76 of FIG. 13 is an inner stator generator. Close to the rotation axis 79 a shaft 9 is located. The stator 78 is connected to the shaft 9. The stator 78 comprises a number of poles 4 which are arranged about circumference of the stator 78. Between the poles 4 slots 19, as previously described, are formed. In the sectional view shown in FIG. 13 the poles 46 have a rectangular shape and the slots 19 have a nearly trapezoidal shape.

The stator 78 and the poles 4 may comprise an iron lamination. The rotor 77 comprises a number of permanent magnets 80. The permanent magnets 80 are arranged about the whole circumference of the rotor 77.

Figure 14:
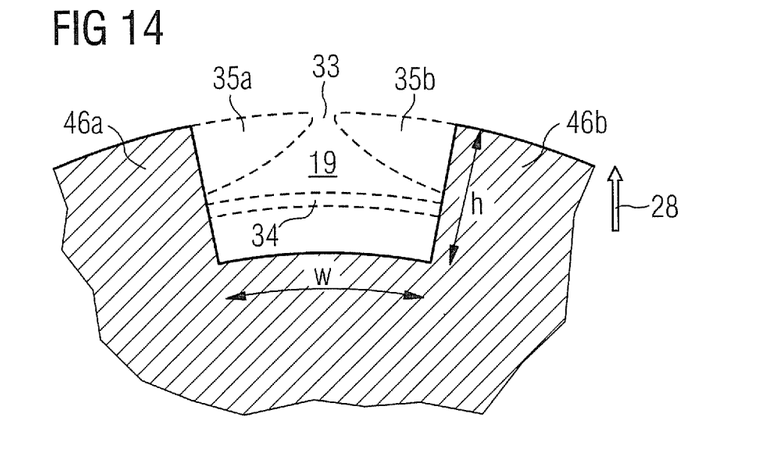
FIG. 14 schematically shows a variant of a trapezoidal slot in a sectional view.

FIG. 14 schematically shows enlarged view of part of the stator 78. FIG. 14 schematically shows a slot 19, which is formed by a first pole 46*a* and a second pole 46*b*, which have the same properties as the previously described poles 4. The slot 19 has a trapezoidal shape in a plane perpendicular to the rotation axis 79. The slot 19 has an increasing width w in radial direction 28. Advantageously, the slot 19 has an average width w which is larger than the depth or height h of the slot 19 in radial direction 28.

The slot 19 can be partly closed by a bridge 34. The bridge 34 can be located at about half of the height or depth h of the slot 19. The bridge 34 can connect the first pole 46*a* with the second pole 46*b*. Alternatively or additionally, the slot 19 can be semi-closed by means of a bridge 35, which comprises a first part 35*a* and a second part 35*b*. The first bridge part 35*a* can be part of or can be connected to the first pole 46*a* and the second bridge part 35*b* can be part of or can be connected to the second pole 46*b*. Between the bridge parts 35*a* and 35*b* an opening 33 can be present. The bridge 35 is preferably located at the maximum width w of the slot 19.

The invention claimed is:

1. A generator, comprising:
   a rotor capable of rotation about a rotation axis;
   a stator located radially inside the rotor, wherein the stator comprises:
      at least one pole set representing one phase, each of the at least one pole set comprising a plurality of poles;
         only one conductor turned about the poles of a particular pole set such that only half a single turn is associated to each pole of the particular pole set, and
      at least one slot between the poles,
      wherein the conductor is at least partially located in the at least one slot, and
      wherein the slot has a triangular shape in a plane perpendicular to the rotation axis, wherein the slot has an incremental opening in radially outward direction related to the rotation axis, the slot having an average width w and a radial depth h related to the rotation axis, wherein the width w has a value of at least 90% of the value of the depth h, and
      wherein said only one conductor forms a single turn wave winding.

2. The generator according to claim 1, wherein the conductor comprises a plurality of conductor elements which are conductively connected in series to each other.

3. The generator according to claim 2, wherein the conductor elements are connected to each other by welding or by a mechanical fixation.

4. The generator according to claim 2, wherein the conductor elements have the shape of straight bars or arcs.

5. The generator according to claim 1, wherein slot is closed or partially closed at a radial position related to the rotation axis.

6. The generator according to claim 1, wherein the slot comprises at least one bridge which partially or fully closes the slot at a radial position related to the rotation axis.

7. The generator according to claim 6, wherein the bridge is an integral part of an element forming the slot or the bridge is a separate element.

8. The generator according to claim 6, wherein the bridge comprises soft magnetic composite material or ferromagnetic material.

9. The generator according to claim 1, wherein said half the single turn designates either a Go path or a Return path of said phase such that said each pole is associated with a single Go path or a single Return path of said only one conductor.

10. A wind turbine, comprising:
    a generator, comprising:
       a rotor capable of rotating about a rotation axis;
       a stator located radially inside the rotor, wherein the stator comprises:
          at least one pole set representing one phase, each of the at least one pole set comprising a plurality of poles;
          only one conductor turned about the poles of a particular pole set such that only half a single turn is associated to each pole of the particular pole set,
          at least one slot between the poles, and
          wherein the conductor is at least partially located in the at least one slot,
          wherein the slot has a triangular shape in a plane perpendicular to the rotation axis, wherein the slot has an incremental opening in radially outward direction related to the rotation axis, the slot having an average width w and a radial depth h related to the rotation axis, wherein the width w has a value of at least 90% of the value of the depth h, and wherein said only one conductor forms a single turn wave winding.

\* \* \* \* \*